(12) United States Patent
Elmeleegy et al.

(10) Patent No.: US 8,140,533 B1
(45) Date of Patent: Mar. 20, 2012

(54) HARVESTING RELATIONAL TABLES FROM LISTS ON THE WEB

(75) Inventors: Hazem Elmeleegy, West Lafayette, IN (US); Jayant Madhavan, San Francisco, CA (US); Alon Halevy, Los Altos, CA (US)

(73) Assignee: Google Inc., Mountain View, CA (US)

( * ) Notice: Subject to any disclaimer, the term of this patent is extended or adjusted under 35 U.S.C. 154(b) by 229 days.

(21) Appl. No.: 12/694,160

(22) Filed: Jan. 26, 2010

(51) Int. Cl.
G06F 7/00 (2006.01)
G06F 17/30 (2006.01)

(52) U.S. Cl. ......................................... 707/737; 707/802

(58) Field of Classification Search ........................ None
See application file for complete search history.

(56) References Cited

U.S. PATENT DOCUMENTS

| | | | | |
|---|---|---|---|---|
| 5,457,792 | A * | 10/1995 | Virgil et al. ........................... | 1/1 |
| 5,778,370 | A * | 7/1998 | Emerson ................................ | 1/1 |
| 5,897,622 | A * | 4/1999 | Blinn et al. ................. | 705/26.81 |
| 6,484,150 | B1 * | 11/2002 | Blinn et al. ................. | 705/26.81 |
| 7,072,934 | B2 * | 7/2006 | Helgeson et al. ............. | 709/203 |
| 7,089,583 | B2 * | 8/2006 | Mehra et al. ...................... | 726/3 |
| 7,882,122 | B2 * | 2/2011 | Wong ............................. | 707/760 |
| 2005/0169302 | A1 * | 8/2005 | Lee et al. ...................... | 370/465 |
| 2005/0182776 | A1 * | 8/2005 | Yennie .......................... | 707/100 |
| 2006/0235811 | A1 * | 10/2006 | Fairweather ................... | 706/12 |
| 2007/0112714 | A1 * | 5/2007 | Fairweather ................... | 706/46 |
| 2007/0294672 | A1 * | 12/2007 | Mosuoka ...................... | 717/126 |
| 2008/0091704 | A1 * | 4/2008 | Yennie .......................... | 707/102 |
| 2009/0192847 | A1 * | 7/2009 | Lipkin et al. ....................... | 705/7 |
| 2009/0234823 | A1 * | 9/2009 | Wong .............................. | 707/4 |
| 2011/0196872 | A1 * | 8/2011 | Sims et al. .................... | 707/740 |

OTHER PUBLICATIONS

Elmeleegy et al. "Harvesting Relational Tables from Lists on the Web", The VLDB Journel, Apr. 2011, pp. 209-226.*
Elmeleegy et al. "Harvesting Relational Tables from Lists on the Web", Proceedings of the VLDB Endowment, Aug. 29, 2009, pp. 1078-1089.*
Cohen, W. et al., "A Flexible Learning System for Wrapping Tables and Lists in HTML Documents", Proceedings of the 11th international conference on World Wide Web, 2002, 19 pages.
Needleman, S. B., et al., "A general method applicable to the search for similarities in the amino acid sequence of two proteins", Journal of molecular biology, vol. 48, No. 3, Mar. 1970, pp. 443-453.
Liu, L. et al., "XWRAP: An XML-enabled Wrapper Construction System for Web Information Sources", Proceedings of 16th International Conference on Data Engineering, 2000, pp. 611-621.
Borkar, V. et al., "Automatic Segmentation of Text Into Structured Records", SIGMOD Conference, 2001, pp. 175-186.

(Continued)

Primary Examiner — Usmaan Saeed
(74) Attorney, Agent, or Firm — Brake Hughes Bellermann LLP

(57) ABSTRACT

Computer implemented methods and apparatus for extracting list information into database tables. A number of fields are independently determined for items in list. A number of database table columns are determined from most common number of list item fields. New fields are determined for items with more fields than database columns. Null fields are inserted into items with fewer fields than database columns. Information from items having the same number of fields as database columns is written to database table rows. Information from each field is written to a corresponding database table column. Streaks of poorly matching cells in a database table row are determined. Streak cells are merged and new cells are determined. Null cells are inserted if number of new cells is less than number of cells in the streak. Information from the new cells is written to the table row and columns that define the streak.

39 Claims, 9 Drawing Sheets

OTHER PUBLICATIONS

Wang, J. et al., "Data extraction and label assignment for web databases", Proceedings of the 12th International Conference on World Wide Web, May 20-24, 2003, pp. 187-196.

Arasu, A. et al., "Extracting structured data from web pages", Proceedings of the ACM SIGMOD international Conference on Management of data, Jun. 9-12, 2003, pp. 337-348.

Zhai, Y. et al., "Extracting Web Data Using Instance-Based Learning", World Wide Web, vol. 10, Issue 2, 2007, 14 pages.

Elmeleegy, H. et al., "Harvesting Relational Tables from Lists on the Web", Proceedings of the VLDB Endowment, vol. 2, Issue 1, Aug. 24-28, 2009, pp. 1078-1089.

Chang, Chia-Hui et al., "IEPAD: information extraction Based on Pattern Discovery", Tenth International World Wide Web Conference, May 1-5, 2001, pp. 681-688.

Edgar, R. C., et al., "Multiple sequence alignment", Current Opinion in Structural Biology, Elsevier, 2006, 6 pages.

Embley, D. W., et al., "Record-boundary discovery in Web documents", Proceedings of the ACM SIGMOD international Conference on Management of data, 1999, pp. 467-478.

Crescenzi, V., et al, "Roadrunner: Towards Automatic Data Extraction from Large Web Sites", Proceedings of the 27th VLDB Conference, 2001, pp. 109-118.

Cafarella, M. J., et al., "Uncovering the Relational Web", Proceedings of the 11th International Workshop on Web and Databases, Jun. 13, 2008, 6 pages.

Michelson, M et al., "Unsupervised information extraction from unstructured, ungrammatical data sources on the World Wide Web", International Journal on Document Analysis and Recognition, vol. 10, Issue 3, 2007, 13 pages.

Barish, G et al., "TheaterLoc: Using information integration technology to rapidly build virtual applications", In International Conference of Data Engineering, 2000, pp. 681-682.

Lerman, K et al., "Using the structure of Web sites for automatic segmentation of tables", Proceedings of the 2004 ACM SIGMOD international conference on Management of data, Jun. 13-18, 2004, pp. 119-130.

Zhai, Y et al., "Web data extraction based on partial tree alignment", Proceedings of the 14th international conference on World Wide Web, May 10-14, 2005, pp. 76-85.

Cafarella, M J., et al., "WebTables-exploring the power of tables on the web", Proceedings of VLDB Endowment, vol. 1, No. 1., 2008, pp. 538-549.

Kushmerick, N et al., "Wrapper Induction for Information Extraction", International Joint Conferences on Artificial Intelligence, 1997, 7 pages.

* cited by examiner

The 50 Greatest Cartoons

1. What's Opera Doc (Warner Bros./1957)
2. Duck Amuck (Warner Bros./1953)
3. The Band Concert (Disney/1935)
4. Duck Dodgers in the 24 ½ Century (Warner Bros./1953)
5. One Froggy Evening (Warner Bros./1956)
6. Gertie the Dinosaur (McCay)
7. Red Hot Riding Hood (MGM/1943)
8. Porky In Wackyland (Warner Bros./1938)
9. Gerald McBoing Boing (UPA/1951)
10. King-Size Canary (MGM/1947)
11. Three Little Pigs (Disney/1933)
12. Rabbit of Seville (Warner Bros./1950)
13. Steamboat Willie (Disney/1928)
14. The Old Mill (Disney/1937)
15. Bad Luck Blackie (MGM/1949)
16. The Great Piggy Bank Robbery (Warner Bros./1946)
17. Popeye the Sailor Meets Sinbad the Sailor (Fleischer/1936)

```
1  | What's Opera Doc                          | Warner Bros | 1957
2  | Duck Amuck                                | Warner Bros | 1953
3  | The Band Concert                          | Disney      | 1935
4. Duck Dodgers in the 24 ½ Century (Warner Bros | 1953
5  | One Froggy Evening                        | Warner Bros | 1956
6  | Gertie the Dinosaur                       | McCay
7  | Red Hot Riding Hood                       | MGM         | 1943
8  | Porky In Wackyland                        | Warner Bros | 1938
9  | Gerald McBoing Boing                      | UPA         | 1951
10 | King-Size Canary                          | MGM         | 1947
11 | Three Little Pigs                         | Disney      | 1933
12 | Rabbit of Seville                         | Warner Bros | 1950
13 | Steamboat Willie                          | Disney      | 1928
14 | The Old Mill                              | Disney      | 1937
15 | Bad Luck Blackie (MGM | 1949
16 | The Great Piggy Bank Robbery              | Warner Bros./1946)
17 | Popeye the Sailor | Meets | Sinbad the Sailor | Fleischer | 1936
```

| Field Candidate | Field Quality |
|---|---|
| 3 | 0.15 |
| The | 0.10 |
| Band | 0.55 |
| Concert | 0.60 |
| Disney | 0.82 |
| 1935 | 0.34 |
| 3 The | 0.08 |
| The Band | 0.89 |
| Band Concert | 0.65 |
| Concert Disney | 0.61 |
| Disney 1935 | 0.51 |
| 3 The Band | 0.07 |
| The Band Concert | 0.92 |
| Band Concert Disney | 0.12 |
| Concert Disney 1935 | 0.03 |
| 3 The Band Concert | 0.11 |
| The Band Concert Disney | 0.68 |
| Band Concert Disney 1935 | 0.07 |
| 3 The Band Concert Disney | 0.11 |
| The Band Concert Disney 1935 | 0.40 |
| 3 The Band Concert Disney 1935 | 0.01 |

| Field Candidate | Field Quality |
|---|---|
| The Band Concert | 0.92 |
| ~~The Band~~ | ~~0.89~~ |
| Disney | 0.82 |
| ~~The Band Concert Disney~~ | ~~0.68~~ |
| ~~Band Concert~~ | ~~0.65~~ |
| ~~Concert Disney~~ | ~~0.61~~ |
| ~~Concert~~ | ~~0.60~~ |
| ~~Band~~ | ~~0.55~~ |
| Disney 1935 | 0.51 |
| ~~The Band Concert Disney 1935~~ | ~~0.40~~ |
| 1935 | 0.34 |
| 3 | 0.15 |
| ~~Band Concert Disney~~ | ~~0.12~~ |
| ~~3 The Band Concert~~ | ~~0.11~~ |
| ~~3 The Band Concert Disney~~ | ~~0.11~~ |
| ~~The~~ | ~~0.10~~ |
| ~~3 The~~ | ~~0.08~~ |
| ~~3 The Band~~ | ~~0.07~~ |
| ~~Band Concert Disney 1935~~ | ~~0.07~~ |
| ~~Concert Disney 1935~~ | ~~0.03~~ |
| ~~3 The Band Concert Disney 1935~~ | ~~0.01~~ |

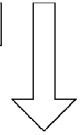

| Field Candidate | Field Quality |
|---|---|
| Disney | 0.82 |
| ~~Disney 1935~~ | ~~0.51~~ |
| 1935 | 0.34 |
| 3 | 0.15 |

HARVESTING RELATIONAL TABLES FROM LISTS ON THE WEB

BACKGROUND

This description relates to methods and apparatus for extracting information contained in a list of items in a document into a relational database table.

Much information exists on the world-wide-web, and much of that information exists in the form of structured data. Structured data is data that is presented in such a way that the presentation itself provides information about the elements of the data and how those elements relate to one another. One common example of structured data is a list. A list is a data structure that contains items of inter-related data elements. Items of a list are often organized on separate rows or lines of the list. For example, a shopping list can contain rows of data elements (items) that are currently needed from a shopping center. Each item of a list can have multiple data elements that are segregated into distinct fields, where each field contains information that is related to the information provided in the other data element fields. For example, each row of a shopping list can have data in two data element fields, one containing the items that are needed from the shopping center as explained above, and the other containing the quantity of items that are needed. Other, more elaborate lists are of course possible.

Another common example of structured data is a relational database table. A relational database table is a data structure that contains rows of data arranged in one or more columns. Each column of the database table defines an attribute of the data that is contained in the rows. Given the structural similarity between lists and relational database tables, structured data in the form of lists in a document can be converted into relational database tables. Once created, the tables can be used to easily extract the information content of the lists using conventional database manipulation techniques. This information content can then be used, for example, as a source of information for synonym discovery or to perform sophisticated web page searching, or to supply missing information in auto-complete schema.

Converting lists into relational database tables is not always a straightforward task, however. First, lists generally are not clearly delineated into columns or cells or fields. Rather, each item or line in a list can consist of largely unstructured text. Moreover, even when delimiters are used to separate the items of a list into fields, the delimiters can be missing in some lines of the list or inconsistently applied in others. Furthermore, information can be missing from an item, and the item can lack any indication that the information is missing or where it should have been provided. Consider, for example, "The 50 Greatest Cartoons" list 700 shown in FIG. 7A. Visual inspection of the list indicates that it contains the following fields: a ranking or identifier (e.g., 1, 2, 3 . . . ), the name of the cartoon, the production company, and the production year. However, some information fields are missing from some of the items of the list. For example, the "Gertie the Dinosaur" line (item 6) is missing the production year. And while many of the lines of the list appear to be well delineated into fields using delimiters such as the period (".") and backslash ("/"), some of the delimiters are missing in some of the lines or are used for other purposes. For example, while a period is generally used to delineate the ranking from the name of the cartoon, it is also used to abbreviate the name of the "Warner Bros." production company in some of the lines. Similarly, while a back slash ("/") is generally used to delineate the name of the production company from the production year, it is part of the cartoon name in the line for the "Duck Dodgers in the 24½ Century" cartoon.

SUMMARY

The application discloses computer implemented methods and apparatus for extracting information from a list into a relational database table. A processor receives a list having a number of items. For each one of a plurality of items of the list, the processor determines the number of fields in the items. The fields have field values that include a sequence of one or more consecutive terms in the item. The processor then determines, based on the determined numbers of fields for the plurality of items, a number of columns for a relational database table. The number of columns can be the most common number of field determined for the plurality of items in the list. Next, the processor identifies items for which the determined number of fields is different than the determined number of relational database columns. If the determined number of fields for an item is greater than the number of columns, the determined fields are merged and a number of new fields that is no greater than the number of columns is determined. The new number of fields can be fewer than the number of columns. If the number of determined fields for an item is less than the number of relational database columns, one or more null fields are inserted into the item so that it has as many fields as the number of columns. When the number of fields for the item is equal to the number of relational database columns, the information in the item is written to a row of the relational database table such that the information in each field is written to a corresponding column of the table.

Features and advantages of the disclosed method and apparatus include one or more of the following:

To determine the number of fields for an item, the processor removes all field delimiters from the item. Field delimiters are characters that typically separate items in a list, such as the colon or semi-colon. The process then determines a list of all possible field candidates for the item, each of which includes one or more terms from the item, and computes a field quality score for each field candidate. The field quality score is a measure of the likelihood that the terms in the field candidate can be grouped together into a common field. The processor then identifies the field candidate in the possible field candidate list that has the highest field quality score as a field candidate for the item, and removes from the possible field candidate list that field candidate and any field candidates that have one or more terms in common with that field candidate. This process is iteratively repeated until the possible field candidate list is empty.

To merge the determined fields of an item having more fields than database columns, and to determine a new number of fields for that item that is no greater than the number of database columns, the processor removes all delimiters from the item, determines a list of all possible field candidates for the item, and determines a field quality score for each field candidate. If the processor saved this information from the initial determination of the number of fields for the item, that information can simply be reused. Next, the processor identifies the field candidate in the possible field candidate list that has the highest field quality score, and removes it from the possible field candidate list. The processor then determines the minimum number of fields that would be needed to represent the item using the field candidates that remain in the possible field candidate list. If the minimum number of fields needed is no greater than the number of database columns, the processor identifies the field candidate as a field for the item and removes from the possible field candidate list any field candidates that have one or more terms in common with the field candidate. If the minimum number of fields needed is greater than the number of database columns, the field candidate is simply discarded. This process is iteratively repeated until the possible field candidate list is empty.

To determine a field quality score of a field candidate, a weighted average is made of a type support score, a table corpus support score, and a language model support score. The type support score measures whether the type of data in the field candidate is of a recognizable type such as a date or a unit of currency. The table corpus support score measures whether the field candidate exists in more than a predetermined number of tables obtained from a corpus of tables. The predetermined number of tables can be one, and the corpus of tables can be tables obtained from the world wide web. The language model support score includes an internal cohesiveness score that measures how likely the sequence of terms in the field candidate is to occur in documents obtained from a corpus of documents that are written in the same language as the list. The language model support score also includes an external cohesiveness component that measures a likelihood that the first term in the field candidate follows the last term in the previous field candidate in documents obtained from the corpus of documents, and a likelihood that the last term in the field candidate precedes the first term in the next field candidate in documents obtained from the corpus of documents. The corpus of documents used in the language support score can be documents obtained from the world wide web.

To insert null fields into an item that has fewer fields than the number of relational database table columns, the processor computes a cost function that measures a cost to align each of the fields in the identified item with each of the columns in the relational database table. The processor then uses this cost function to align each of the fields in the item with a corresponding column in the relational database table, and inserts null fields in the item so that the null fields are aligned with any columns in the relational database table that are not aligned to any fields in the item. The cost function is based on consideration of the separate costs of not aligning a field of the item to any column in the relational database table, not aligning a column of the relational database table to any field in the item, and aligning a field in the identified item with a column in the relational database table. The cost of not aligning a column of the relational database table to any field in the item is set to a constant value that is the same for all of the columns in the relational database table. The cost of not aligning a field of the item to any column in the relational database table is set to an extreme value so that all fields in the item are aligned to corresponding columns in the relational database table. The cost of aligning a field in the item to a column in the relational database table is based on an average of a plurality of field-to-field consistency scores. Each field-to-field consistency score measures a consistency between a field value in the item and a cell value in the column and one of the rows of the relational database table.

To determine a field-to-field consistency score between a field value of an item and a cell value of a row and column of the relational database table, the processor computers a weighted average of a data type consistency score, a table corpus consistency score, a delimiter consistency score, and a syntax consistency score. The data type consistency score measures whether the field value and the cell value contain the same type of recognizable data such as a date or a unit of currency. The table corpus consistency score measures a likelihood that the field value and the cell value can both be found in a column of a database table taken from a corpus of database tables. The corpus of database tables can be tables obtained from the world wide web. The delimiter consistency score measures a consistency between delimiters that separate the field value from adjacent field values in the item and delimiters that separate a field value written to the cell from adjacent field values written to cells in adjacent columns of the same row. The syntax consistency score measures the consistency of the syntactical appearance of the field value and the cell value. The processor determines the consistency of the syntactical appearance of the field value and the cell value as the average consistency between a plurality of features of the field value and the cell value. These features can include the number of letters in the field value and cell value, the number of upper case letters in the field value and cell value, the number of lower case letters in the field value and cell value, the number of digits in the field value and cell value, and the number of punctuation symbols in the field value and cell value.

To refine the database table, the processor can identify streaks of poorly matching cells in rows of the database table. A streak is defined by two or more adjacent columns in the row whose cell values have field-to-field consistency scores that are below a threshold. The threshold can be cell values whose field-to-field consistency scores are below the median field-to-field consistency scores for other cells in the same relational database column. After identifying streaks of poorly matching cells in a row, the processor merges the poorly matching cells of the streak and determines new cells for the streak such that the number of new cells is no greater than the number of poorly matching cells in the streak. If the new number of new cells is less than the number of poorly matching cells in the streak, the processor inserts null cells into the streak and aligns the new cells with columns of the relational database table that define the streak. The processor than writes the information from the new cells into the row and columns of the relational database table that defines the streak.

BRIEF DESCRIPTION OF THE DRAWINGS

FIG. 7A is a schematic diagram illustrating an example list of items.

FIG. 7B is a schematic diagram illustrating the splitting of the items in the exemplary list of FIG. 7A into a plurality of fields.

FIGS. 8A-8C is a schematic diagram illustrating a process by which an item in the exemplary list of 7A can be split into a plurality of fields.

DETAILED DESCRIPTION

Figure 1:
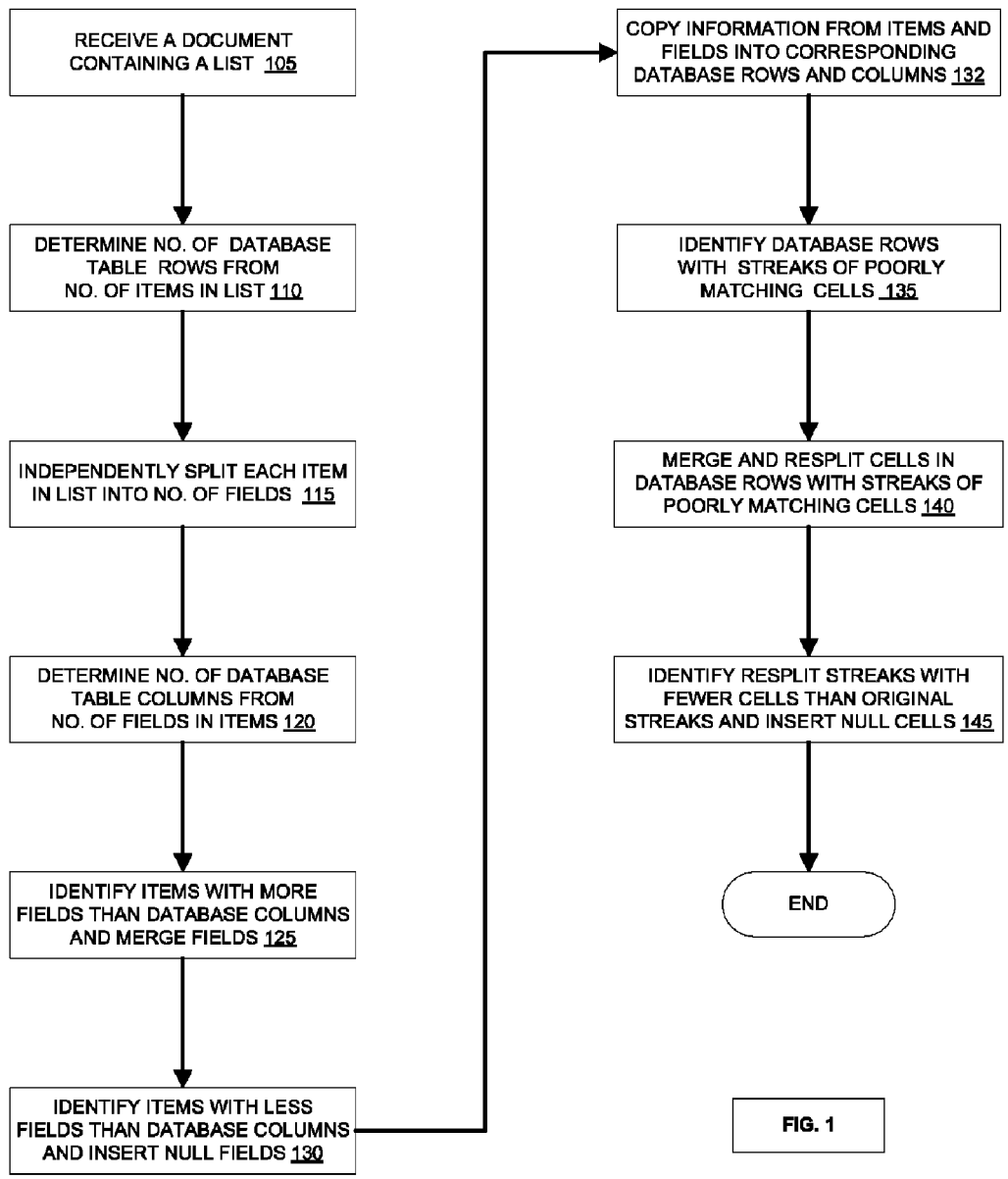
FIG. 1 is a flowchart illustrating a method for extracting a relational database table from a list of items in a document.

FIG. 1 is a flowchart illustrating a method for extracting a relational database table from a list of items in a document. As shown in the figure, a document containing a list is received (105). The document can be any type of document containing a list, including a web-page or a word-processing document. In one implementation, the received document is a web-page containing an HTML list. Once received, the number of items in the list is determined. In one implementation the number of items in the list can be determined based on the number of delimiters present in the list. For example, a carriage return symbol or a bullet point symbol may indicate the presence of a new item in the list in a word processing document or hypertext anchors such as the <item> . . . <\item> anchors might be used to identify different items of a list in an HTML document. The number of items in the list is used to determine the number of rows in the database table that will be extracted from the list (110), such that the number of database rows is equal to the number of items in the list.

Next, each item in the list is independently split into one or more fields (115). This process is explained more fully below in reference to FIG. 2. The fields in an item identify separately recognizable characteristics of the information or data that is contained in the item. For example, the cartoon list 700 described in FIG. 7A can be split into fields identifying the rank, cartoon name, production company and production year of the cartoons in the list. When the items in the list are split into fields, they are completely split into fields having no overlapping terms, where terms can include one or more words, numbers, characters, or phrases. Thus, each term in an item is assigned to one and only one field, and no terms are repeated or used in two or more adjacent fields. Since the items in the list are independently split, different items can be split into different numbers of fields. The number of columns in the database table that will be extracted from the list is obtained by determining the most common number of fields into which the items of the list are independently split (120). For example, in the cartoon list 700 shown in FIG. 7B, thirteen of the seventeen items are split into 4 fields, one item ("Duck Dodgers") is split into 2 fields, two items ("Gertie" and "Bad Luck") are split into 3 fields, and one item ("Popeye") is split into 6 fields. For this list, the most common number of fields into which the items are independently split is 4, and a database is created having four columns and seventeen rows.

Once the number of database columns is determined, items that were split into more fields than database columns are identified, and the fields in those items are merged and re-split so that the item has no more fields than database columns (125). Items that are merged and re-split can, however, have fewer fields than database columns. A more complete explanation of the merging and re-splitting of items with too many fields is explained below in reference to FIG. 3. Next, items in the list with fewer fields than database columns are identified, and null fields are inserted into the items so that they have the same number of fields as database columns (130). The null fields are inserted into information fields the items appear to be missing as explained more fully below in reference to FIGS. 4 and 5. For example, in FIG. 7B, a null field would be inserted into the date field for the "Gertie" cartoon since that item is missing the production date for the cartoon.

Next, the information from all of the items in the list is copied into a database table such that the information from each item is copied into a corresponding row of the database table, and the information from each field in an item is copied into a corresponding column of the database table (132). In addition, a field summary table is created from the items of the list that are of the highest quality (as explained below). Next, for each cell in the database table, the quality of the match between the information in that cell and the information in cells in the same column but different rows of the database table is determined. Rows of the database table having streaks of two or more poorly matching cells (i.e., two or more adjacent cells whose information is poorly matched to the information in the cells of the corresponding columns of the database table) are identified (135). These streaks of poorly matched cells are merged together and re-split into no more cells than the original number of cells in the streak (140). Merged streaks can be re-split, however, into fewer cells than the original number of cells in the streak. These re-split streaks are also identified, and null cells are inserted into the streaks where information appears to be missing (145). At this stage, a database table has been extracted from the received list. In FIGS. 2-6 below, the details of many of these steps is more fully explained.

Figure 2:
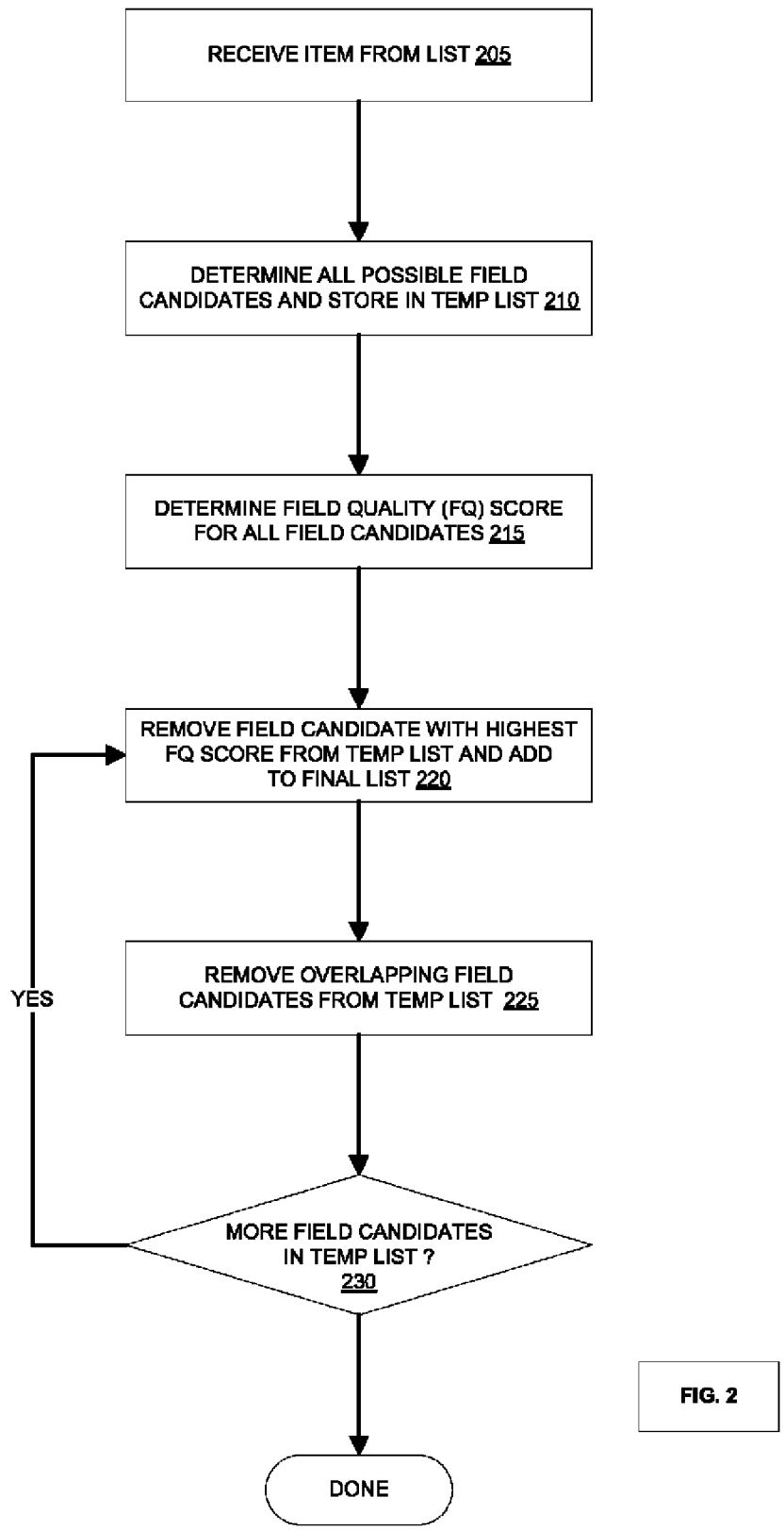
FIG. 2 is a flowchart illustrating a method for determining the fields of an item in a list of items.

FIG. 2 is a flowchart illustrating a method for determining the fields of an item in a list. Each item in the list is received (205). Next, all delimiters in the item are removed. In one implementation, delimiters are characters that belong to the set {, ; : . / \ ( ) < > & | # ! ?}. Of course, other characters can be removed as delimiters. For example, the following characters could also be considered delimiters {* + − @ $ %} and removed. Once the delimiters are removed, all possible field candidates for the item are determined and stored in a temporary list (210). Field candidates are one or more adjacent terms in an item, where a term can be words, numbers, symbols or separately cognizable character strings. Thus, for an item with m terms, a temporary list of $m*(m+1)/2$ field candidates can be created. This is shown, for example, in FIG. 8A, which discloses a temporary list 800 containing the 21 possible field candidates for the third item in cartoon list 700. Once all possible field candidates are determined (210), a field quality score ("FQ") is determined for each possible field candidate (215), as explained more fully below, and used to determine how to split each item of the list into one or more fields.

In general, there are many different ways to split an item into fields, subject only to the constraint that when they are split into fields, they are completely split so that each term in the item is assigned to one and only one field. In one implementation, the field quality score is used to determine how to split an item by first determining all possible field candidate splits (i.e., all possible field candidate combinations that completely split the item), and then determining the field candidate split that maximizes the sum or average of the field quality scores of the field candidates that are used in that field candidate split. In another implementation, illustrated in the bottom portion of FIG. 2, a so-called greedy algorithm is used to determine how to split an item based on the field quality scores of the field candidates in the item. In this implementation, the temporary field candidate list is first sorted by field quality score. The field candidate with the highest field quality score is then removed from the temporary field candidate list and added to a final list of fields for the item (220). Next, any remaining field candidates in the temporary field candidate list having terms that overlap with the terms in the just removed field candidate are removed from the temporary field candidate list (225). If the temporary field candidate list contains additional field candidates (230), the process of removing the field candidate with the highest field quality score (220), and removing any field candidates with terms that overlap the just removed field candidate (225) is repeated until no more field candidates remain in the temporary field candidate list (230).

FIGS. 8A through 8C illustrate this greedy algorithm. As shown in FIG. 8B, after sorting the field candidate list 800 by field quality score, the field candidate with the highest field quality score (i.e., "The Band Concert") is removed from the temporary field candidate list 800 and is added to the final list of fields for the item. Next, all field candidates in temporary field candidate list 800 that contain any of the words "The," "Band," or "Concert" are removed from the list 800 as illustrated with a strikethrough. Since temporary field candidate list 800 is not empty, the process is repeated as shown in FIG. 8C. Here, the "Disney" field candidate is identified as the field candidate with the highest field quality score, and is removed from the temporary field candidate list 800 and added to the final list of fields for the item. As before, all field candidates in temporary field candidate list 800 that contain the term "Disney" are removed from the list 800 as illustrated in FIG. 8C with a strikethrough. Since two field candidates remain in the temporary field candidate list 800, namely, the production year (1935) and the ranking (3), and neither field candidate contains terms that overlap with the other, the process is repeated two more times before list 800 is empty. At that point, as shown in FIG. 7B, the greedy algorithm has identified the following fields for the third item of cartoon list 700: "The Band Concert" (title), "Disney" (production company), "1935" (production year), and "3" (ranking).

As discussed above, a field quality score for candidate fields is used to determine how to split an item in a list into fields. In one implementation, the field quality score for a field candidate f is determined from a weighted average of a type support score $S_t(f)$, a table corpus support score $S_{tc}(f)$, and a language model support score $S_l(f)$, where each score is given equal weight. The type support score measures whether the type of data in the field candidate is recognizable (e.g., as a date, email address, URL, unit of currency, phone number, zip code, etc.). It is assigned the value of 1 if the data in the field candidate is of a recognizable type, and a value of 0 if it is not. The table corpus support score measures whether the field candidate exists in more than some predetermined number of tables obtained from a corpus of tables. It is assigned the value of 1 if the field candidate occurs in more than the predetermined number of tables, and the value of 0 if the field candidate occurs in fewer than the predetermined number of tables. In one implementation, the corpus of tables is obtained from the world-wide-web, and the predetermined number of tables is one. The language model support score measures how likely the sequence of terms in the field candidate is to occur in a corpus of documents that are written in the same language as the list. In one implementation, the corpus of documents are documents that are obtained by crawling the world-wide-web, and the likelihood that the sequence of terms occurs in the corpus of documents is determined as a conditional probability as explained below.

In one implementation, the language model support score is a weighted average of two components, an internal cohesiveness component and an external cohesiveness component, and the two components are equally weighted. The internal cohesiveness component measures how likely the sequence of terms in the field candidate is to occur in the corpus of documents. More specifically, if the field candidate consists of a sequence of $\langle w_1, w_2, w_3, \ldots, w_m \rangle$, the internal cohesiveness component is determined by averaging the conditional probabilities that each word in the sequence follows the previous word(s) in the sequence in documents obtained from the corpus of documents that contain the previous word(s) in the sequence. That is, the internal cohesiveness component is determined by the average of the conditional probabilities $P(w_2|w_1)$, $P(w_3|w_1,w_2)$, $P(w_4|w_1,w_2,w_3)$, ..., $P(w_m|w_1,w_2,\ldots w_{m-1})$, where for example, $P(w_3|w_1, w_2)$ is the probability that the word $w_3$ follows the sequence of words $\langle w_1, w_2 \rangle$ in documents obtained from the corpus of documents that contain the sequence of words $\langle w_1,w_2 \rangle$.

The external cohesiveness component of the language model support score measures how likely the field candidate contains proper boundaries, i.e., first and last words in its sequence of words. More specifically, the external cohesiveness component is determined from the inverse of the average of two conditional probabilities, $P(w_1|w_p)$ and $P(w_n|w_m)$, where $P(w_1|w_p)$ is the conditional probability that the first word in the field candidate "$w_1$" follows the last word in the previous field candidate "$w_p$" in documents obtained from the corpus of documents that contain the last word in the previous field candidate, and $P(w_n|w_m)$ is the conditional probability that the last word in the field candidate "$W_m$" precedes the first word in the next field candidate "$w_n$" in documents obtained from the corpus of documents that contain the last word in the field candidate. When no previous field candidate exists, the conditional probability $P(w_1|w_p)$ is set to one. Similarly, when no next field candidate exists, the conditional probability $P(w_n|w_m)$ is set to one.

As explained above in reference to FIG. 1, the items in the list can be independently split into different numbers of fields. Moreover, the number of columns in the extracted database table is determined from the most common number of fields into which the items are split. As a result, some items of the list may be split into more fields than database columns, and these items need to be re-split subject to the constraint that they have no more fields than database columns. In one implementation, this is achieved by employing a modified version of the greedy algorithm, which is described below in reference to FIG. 3.

Figure 3:
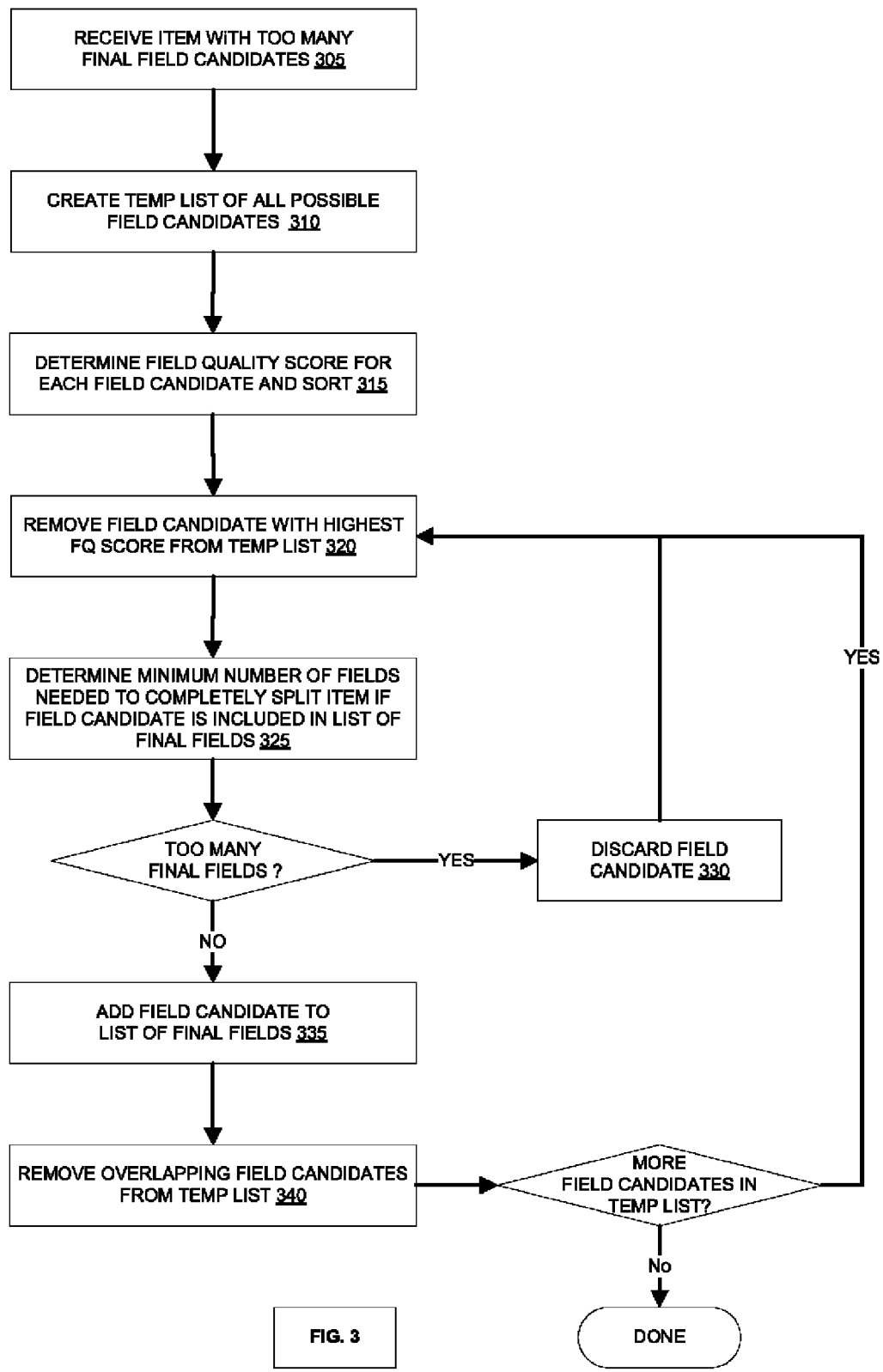
FIG. 3 is a flowchart illustrating a method for determining the fields of items in a list subject to the constraint that the number of fields is less than a predetermined number.

FIG. 3 is a flowchart illustrating a method for determining the fields of an item in a list subject to the constraint that the number of fields is less than a predetermined number. As shown in FIG. 3, an item with more fields than database columns is received (305). Next, all delimiters in the item are removed, all possible field candidates for the item are determined and stored in a temporary list (310), and a field quality score ("FQ") is determined for each possible field candidate (315). In one implementation, the processes for removing delimiters from the item, determining all possible field candidates for the item, and determining field quality scores for each field candidate in the item are the same processes as the processes discussed above in reference to FIG. 2. In this implementation, the list of all possible field candidates and the FQ scores for each of those field candidates are saved when the item is initially split so they do not have to be re-determined if the item needs to be re-split. They are then used in the re-splitting phase to determine how to re-split items subject to the two constraints mentioned above, i.e., that the items are completely split so that each term in the items are assigned to one and only one field and the number of fields is no greater than the number of database columns.

As in the initial splitting phase, the temporary field candidate list is sorted by field quality score, and the field candidate with the highest field quality score is removed from the temporary list (320). However, before adding the just removed field candidate to the item's list of final field candidates, the minimum number of field candidates needed to completely re-split the item is determined assuming the just removed field candidate is added to the item's list of final field candidates (325). This is done by adding to the item's number of final field candidates (which is assumed to include the just removed field candidate) the minimum number of field candidates remaining in the list of temporary field candidates that would be needed to completely re-split the item (i.e., to re-split the item such that all of the terms in the item are in one and only one final field candidate). If adding the just removed field candidate to the item's list of final field candidates would cause the item to be re-split with a minimum number of fields that is greater than the number of database columns, the just removed field candidate is discarded (330), and a new field candidate having the highest field quality score is removed from the temporary list of field candidates (320). If, however, adding the just removed field candidate to the item's list of final field candidates would not cause the item to be re-split with a minimum number of fields that is greater than the number of database columns, the just removed field candidate is added to the item's list of final fields (335). This process ensures that the re-split item will have no more final field candidates than database columns. The re-split item can, however, have fewer final field candidates than database columns.

If the just removed field candidate is added to the item's final list of field candidates, any field candidates in the temporary field candidate list having terms that overlap with the terms in the just removed field candidate are removed from the temporary field candidate list (340). If the temporary field candidate list is not empty, the process of removing the field candidate with the highest field quality score (320), determining the minimum number of fields needed to completely re-split the item if the just removed field candidate is added to the item's list of final field candidates (325), adding the just removed field candidate to the item's final list of field candidates only if the item can be completely re-split with a minimum number of fields that is no greater than the number of database columns (335), and removing field candidates having terms that overlap terms in the just removed field candidate from the temporary list of field candidates (340) is repeated until the temporary list of field candidates is empty. At this point, a preliminary database table can be constructed from the items of the list, as discussed below in reference to FIG. 4

Figure 4:
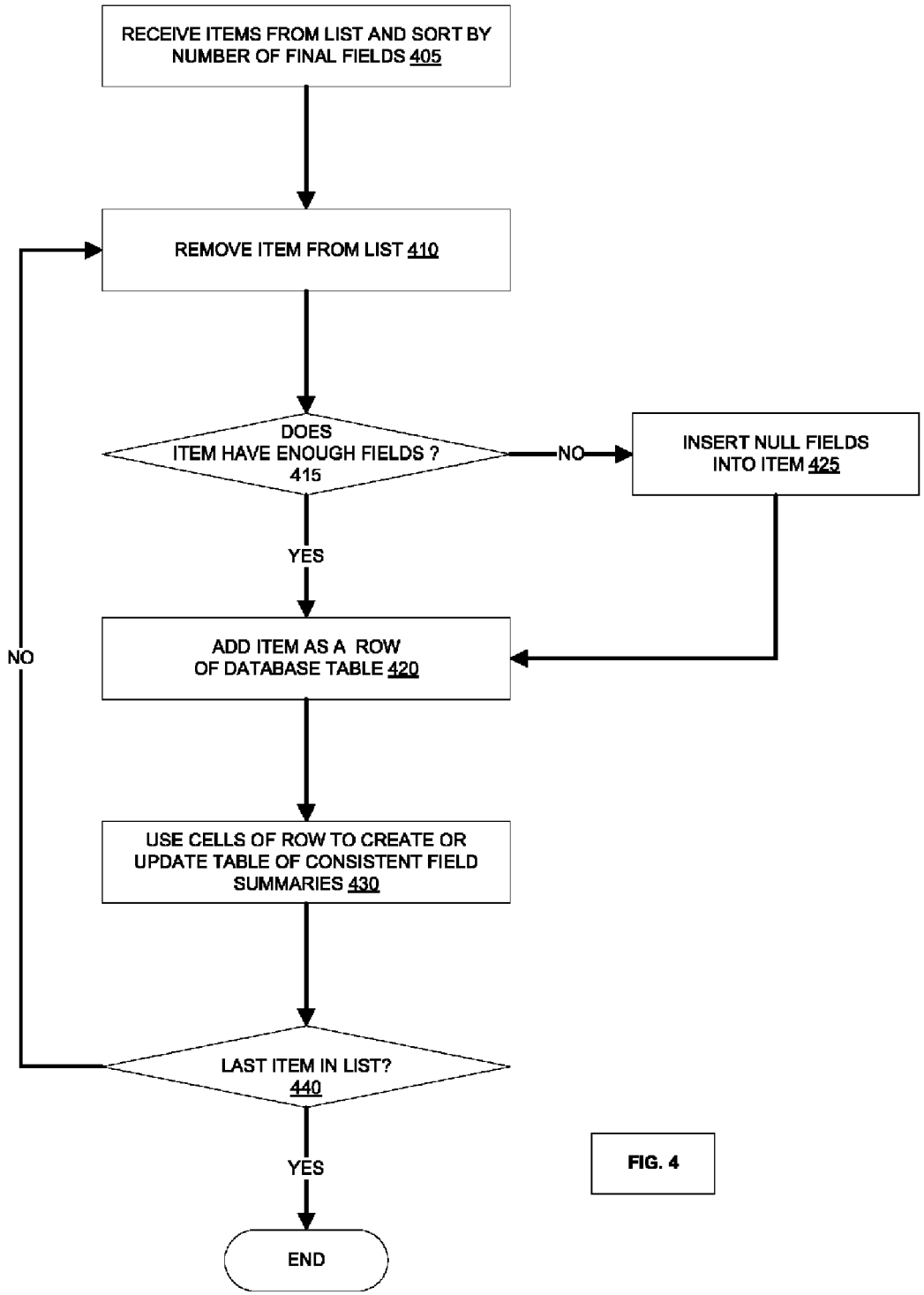
FIG. 4 is a flowchart illustrating a method for creating a database table from items in a list having no more fields than the number of database columns.

FIG. 4 is a flowchart illustrating a method for creating a database table from a list of items having no more fields than the number of database columns. The method begins when the items of the list (including the final fields determined as explained above) are received (405) and sorted according to the number of fields they contain. Each item is then removed from the list (410), and if the item has the same number of fields as database columns (415), it is added to the database table (420). However, if the item has fewer fields than database columns (415), null fields are inserted into the item (425) before the item is added to the database table (420). The process for inserting null fields into the item is explained more fully below in reference to FIG. 5. Next, in one implementation, information from the fields in the item that was just added to the database table is used to create (in the first few instances) or update (in later instances) a consistent field summary table (430). The creation and updating of the consistent field summary table is explained more fully below in reference to FIG. 9. If the recently added item is the last item in the list (440), the process terminates. Otherwise, the process of removing the next item from the list (410) and adding it to the database table (420) either as is or after inserting a null field (425), is repeated until all the items in the list have been added to the database table (440).

Figure 5:
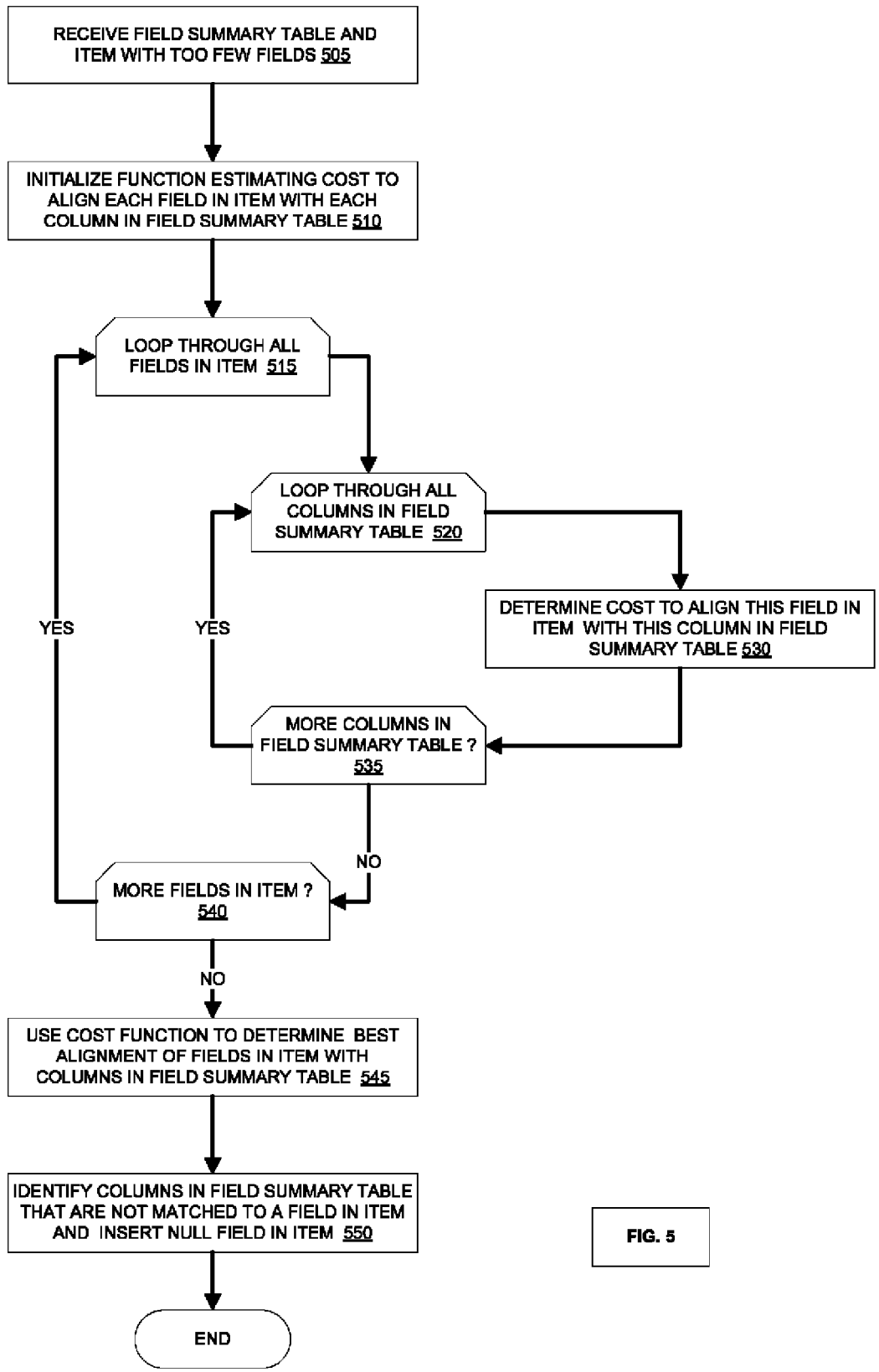
FIG. 5 is a flowchart illustrating a method for inserting null fields into items of a list to align the item's fields with a predetermined set of fields.

FIG. 5 is a flowchart illustrating a method for inserting null fields into an item in a list to align the fields of the item with a predetermined set of database columns. As discussed above, since the items of the list are independently split, they can be split into different numbers of fields. And since the number of database columns is determined by the most common number of fields into which the items are split, some items of the list can be split into fewer fields than database columns. Moreover, some items can be initially split into more fields than database columns, and then re-split into fewer fields than database columns. This can occur, for example, because the items are missing information fields or because the items were incorrectly split. For example, in FIG. 7B, the "Gertie" item was split into 3 rather than 4 fields because it is missing the production date field, while the "Duck Dodgers" item was split into 2 fields rather than 4 because it was incorrectly split. To align the fields of items having fewer fields than database columns with the database columns, null fields are inserted into the items in places where they are likely to be missing information. This is done using a modified version of the Needleman-Wunsch algorithm that is described in the paper: S. B. Needleman and C. D. Wunsch, "A general method applicable to the search for similarities in the amino acid sequence of two proteins," Journal of Molecular Biology, Vol. 48, No. 3, pp. 443-453, March 1970, which is hereby incorporated by reference in its entirety.

As shown in FIG. 5, the null insertion and alignment process 425 shown in FIG. 4 begins by receiving an item having fewer fields than the number of columns in the database table and a field summary table (505). The field summary table is created and updated as the items in the list are individually added to a database table in a process that is more fully explained below in reference to FIG. 9. The field summary table contains, for each column in the database table, the most consistent cells from one or more rows in the database table. Initially, the field summary table only contains cells whose field information came from items in the list that have the same number of fields as database columns. However, as null fields are inserted into items with missing fields and these items are added to the partially filled database table, the field summary table can also contain cells whose field information came from these items. In one implementation, the null insertion and alignment process can receive and use all the information in the database table rather than a field summary table in step 505.

After the item with a missing field and the field summary table are received (505), a cost function $C(i,j)$ is initialized (510). The cost function measures the cost to align the first i fields in the item with the first j columns of the field summary table, where a higher cost reflects a better alignment. In one implementation, the cost function is initialized so that $C(0,0)=0$, $C(i,0)=\Sigma_{k=1}^{i} UMF(k)$, and $C(0,j)=\Sigma_{k=1}^{j} UMC(k)$, where $UMF(k)$ is the cost of not matching the kth field of the received item to any column in the field summary table, and $UMC(k)$ is the cost of not matching the kth column of the field summary table to any field in the received item. In one implementation, all fields in the received item are required to match a column in the field summary table, and the value of $UMF(k)$ is set to an arbitrarily large negative number (e.g., negative infinity) for all fields k in the received item. In addition, in one implementation, the cost for failing to match a column in the field summary table with a field in the received item is set to a constant value that is independent of which column goes unmatched. In other implementations, information about the columns can be used to put a higher cost (i.e., larger negative number) on failing to match particular columns that should be matched.

Once the cost function is initialized, it can be iteratively determined by looping through all of the fields in the received item (515), and all of the columns in the received field summary table (520). For a given field i in the item and a given column j in the field summary table, the cost for matching the first i fields in the item with the first j columns in the field summary table is determined as:

$$C(i, j) = \max \begin{Bmatrix} C(i, j-1) + UMC(j) \\ C(i-1, j) + UMF(i) \\ C(i-1, j-1) + M(i, j) \end{Bmatrix}$$

where UMC(j) is the cost of not matching the jth column of the field summary table and UMF(i) is the cost of not matching the ith field in the item as explained above, and M(i,j) is the cost to match the ith field in the item with the jth column in the field summary table. The value of M(i,j) is determined as the average of one or more field-to-field consistency scores (F2FC), where each field-to-field consistency score measures the consistency between the value of the ith field in the received item and the value of the cell in the jth column of one of the rows in the field summary table as explained more fully below.

Once the cost function has been completely determined (e.g., for all fields in the received item and for all columns in the field summary table), it is used to determine the best alignment of the fields in the item with the columns in the field summary table (545). This is done by tracing back the decisions made in computing the cost function from the last element computed (i.e., C(I,J), where I is the last field in the item and J is the last column in the field summary table) to the first initialized element (i.e., C(0,0)), and determining for a given element (e.g., C(i,j)) whether that element was maximized by the function that included the cost UMC(j) for having an unmatched column, by the function that included the cost UMF(i) for having an unmatched field, or by the function that include the cost M(i,j) for matching the ith field of the received item to the jth column of the field summary table. Once the best alignment of fields in the item to columns in the field summary table is determined, columns in the field summary table that are not matched to fields in the item are identified, and null fields are inserted into the item to preserve the alignment between fields in the item that match columns in the field summary table (550).

As explained above, the cost function M(i,j) depends on one or more field-to-field consistency scores, F2FC($f_1$, $f_2$), which measure the consistency between two field values $f_1$ and $f_2$. For example, the field value $f_1$ can be the value of the ith field of an item having missing fields, and the field value $f_2$ can be the value of a cell in the jth column of one of the rows in the field summary table. Moreover, as explained in FIG. 9 below, the field values $f_1$ and $f_2$ can be the values from two cells that are taken from the same column but different rows of the database table. In one implementation, F2FC($f_1$, $f_2$) is a weighted average of a data type consistency score $S_t(f_1, f_2)$, a table corpus consistency score $S_{tc}(f_1, f_2)$, a delimiter consistency score $S_d(f_1, f_2)$, and a syntax consistency score $S_s(f_1, f_2)$, where each score is given equal weight.

The data type consistency score $S_t(f_1, f_2)$ measures whether the field values $f_1$ and $f_2$ contain the same type of recognizable data. As discussed above in reference to FIG. 2, recognizable data types include, but are not limited to, dates, email addresses, URLs, units of currency, phone numbers, zip codes, etc. The data type consistency score is assigned the value of 1 if the data in the field values $f_1$ and $f_2$ are of the same type, and a value of 0 if they are not. The table corpus support score $S_{tc}(f_1, f_2)$, measures whether the two field values $f_1$ and $f_2$ exist as cells in the same column but different rows of database tables taken from a corpus of database tables. In one implementation, it is determined as the average of the conditional probabilities $P(f_1|f_2)$ and $P(f_2|f_1)$, where $P(f_i|f_j)$ measures the probability that field value $f_i$ exists in a cell in the same column but a different row of database tables taken from a corpus of database tables that contain the field value $f_j$ in at least one cell. In one implementation, the corpus of database tables is obtained from the world-wide-web.

The delimiter consistency score $S_d(f_1, f_2)$ measures the consistency of the delimiters, if any, that separate the field values $f_1$ and $f_2$ from the other field values in their respective rows. In one implementation, it is assigned a value of 1 if the field values $f_1$ and $f_2$ have the same delimiters on both ends, a value of 0.5 if the field values $f_1$ and $f_2$ have the same delimiter on only one of their ends, and a value of 0 otherwise. As before, characters belonging to the set $\{, ; : . / \backslash ( ) < > \& \# ! ?\}$ are a non-exhaustive example of the types of characters that are considered field delimiters. However, other characters can be considered delimiters when determining the delimiter consistency score. For example, the HTML tags, such as the bold tags <b> . . . <\b> and italics tags <i> . . . <\i> can be considered field delimiters. Thus, the bolded field value <b>Barak Obama <\b> is more consistent with the bolded field value <b> Nicolas Sarkozy<b> than it is to the italicized field value <i>France<\i>, because the field value France is in italics rather than in bold.

Finally, the syntax consistency score $S_s(f_1, f_2)$ measures the consistency of the syntactical appearance of the two field values $f_1$ and $f_2$. In one implementation, this is determined by considering the consistency between the following features of the field values: the number of letters in the field values; the number or percentage of letters that are upper case and lower case, respectively; the number or percentage of characters in the field values that are digits; and the number or percentage of characters in the field values that are punctuation characters. Of course, additional features can be used to measure the syntactical consistency of field values $f_1$ and $f_2$. For example, the number of definite or indefinite articles that are used in the field values, or the number of currency symbols that are contained in the field values could also be used to measure their syntactical consistency. For each feature of the field values $f_1$ and $f_2$, the expression $1-(|v_1-v_2|/\max(v_1, v_2))$ is determined, where $v_1$ is the value for a given feature of field value $f_1$ (e.g., the number of letters in the field value), and $v_2$ is the value for the same feature of field value $f_2$. The syntax consistency score $S_s(f_1, f_2)$ is determined as the average of the feature scores over all of the features considered for field values $f_1$ and $f_2$.

When the processes illustrated in FIGS. 4 and 5 is complete, a preliminary database table has been constructed from the initial list of items received in step 105 of FIG. 1. Since the information in a given row and column (i.e., cell) of the database table has been obtained from the information in a given item and field of the list, respectively, and the items of the list were independently split into fields, it is possible that the information in a given cell (i.e., row and column) of the database table may poorly match the information in other cells in the same column but different rows of the database table. These inconsistent cells can occur because the item in the list was incorrectly split into fields or because the item was missing information and a null field was inserted where the information was missing. In one implementation, all cells in the database table containing null fields are considered to be inconsistent with cells in the same column but different rows of the database table. To refine the preliminary database table, and to correct rows obtained from list items that may have been incorrectly split, streaks of inconsistent cells in rows of the database table are first identified and then re-split in a process illustrated and described in FIG. 6.

Figure 6:
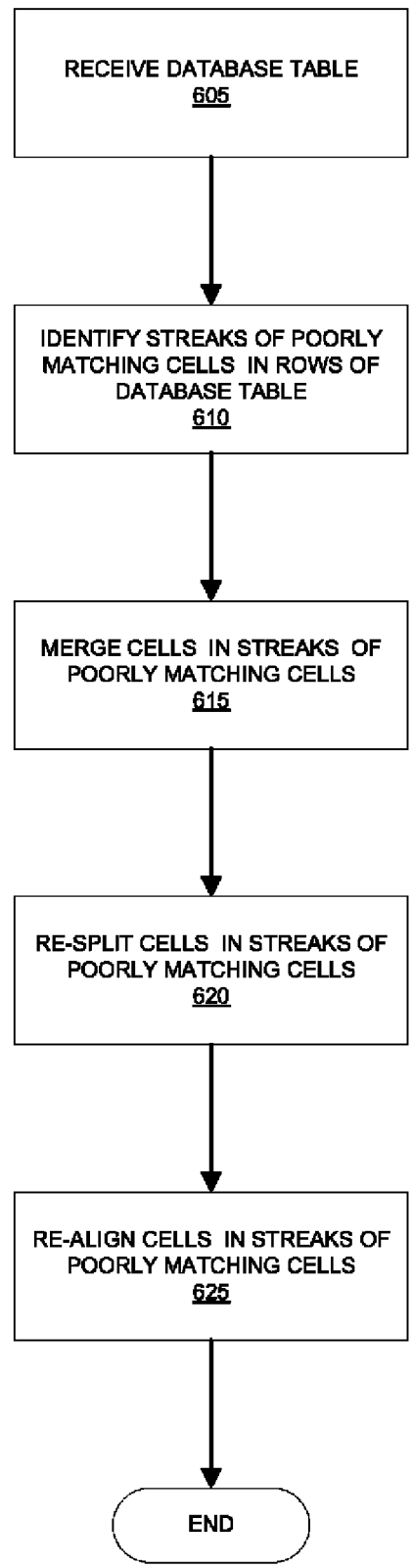
FIG. 6 is a flowchart illustrating a method for realigning the cells of a relational database row with a predetermined set of columns when two or more cells in the row are misaligned with the predetermined set of columns.

FIG. 6 is a flowchart illustrating a method for realigning the cells of relational database row with a predetermined set of columns when two or more cells in the row are misaligned with the predetermined set of columns. The process begins by receiving a database table (605). The database table can be, for example, the table created in the processes illustrated in FIGS. 4 and 5. Once the database table is received streaks of poorly matching cells in the rows of the database table are identified (610). In one implementation, this is done by determining, for each cell (i.e., row and column) of the database table, the average field-to-field consistency score (F2FC) between the value of that cell and the value of cells in the same column but different rows of a field summary table. The field summary table and the F2FC score can be the same field summary table and F2FC score that were described above in reference to FIGS. 4 and 5. For each column of the received database table, the F2FC scores of the cells in that column are sorted in descending order. Since higher F2FC scores reflect cells that more consistently or better match the other cells in the same column, the cells whose F2FC scores lie in the bottom $50^{th}$ percentile of the scores for that column (i.e., cells whose F2FC score is less then the median F2FC score for all of the cells in that column) are designated inconsistent cells. Next, rows in the database table that contain streaks of two or more such inconsistent cells are identified. In one implementation, rows containing streaks of two or more inconsistent cells are ignored if all of the inconsistent cells contain null fields.

Once rows in the database table having streaks of inconsistent cells have been identified, the cells that make up the inconsistent streaks are merged (615), and the inconsistent streaks are re-split subject to the constraint that the re-split streaks have no more cells than the number of cells in the original streaks (620). In one implementation, the merged cells of inconsistent streaks are re-split using the same process that was used to re-split items in a list having more fields than database columns as described above in reference to FIG. 3. However, an additional score is added to the field quality score (FQ) that is used to rank candidate fields (i.e., new cell values) during the re-splitting process. This addition score, called the list support score, biases the FQ score of candidate fields (i.e., new cell values) to favor candidate fields that are more consistent with one or more of the columns in the field summary table that are spanned by the streak. Adding this list support score to the FQ score improves the process of re-splitting streaks of inconsistent cells over the process of re-splitting items with too many fields, since it uses the information in the other rows of the field summary table to determine how to re-split merged streaks into cells. In one implementation, the list support score $S_j(f)$ for a field candidate f of a merged streak is determined as the maximum of the field-to-field consistency scores $F2FC(f, f_j^c)$ between the field candidate f and the cell values for each of the columns of the field summary table that are spanned by the merged streak. That is, $S_j(f)=\max(F2FC(f,f_j^c))$, where the index j runs over the database table columns that are spanned by the inconsistent streak, and the field-to-field consistency score is the same as the score described above in reference to FIGS. 4 and 5.

When streaks of inconsistent cells are re-split, they can be re-split into fewer cells than the number of cells in the original streaks. The process shown in FIG. 6 identifies such re-split streaks, and inserts null fields to ensure they have the same number of cells as the original streaks, and that the cells are properly aligned with the database columns (625). In one implementation, the process for inserting null fields and re-aligning re-split streaks having fewer cells than the original streaks is the same process for inserting null fields and aligning the fields of items in a list having fewer fields than database columns discussed above in reference to FIGS. 4 and 5. Once the process illustrated in FIG. 6 is complete, a refined database table has been extracted from the received list of items.

As discussed above, the process for aligning a field in an item with a column in a database table requires determining a field-to-field consistency score that measures the consistency between the field in the item and the columns of the database table. In one implementation, these field-to-field consistency scores are determined using the entire database table. In another implementation, these field-to-field consistency scores are determined using a field summary table. The field summary table contains, for each column of the database table, a representative number of rows whose fields (i.e., cells) have the best or highest field-to-field consistency scores. In one implementation, the representative number of rows per column of the database table is three. Moreover, different columns of the database table can have different representative rows. For example, in a database table having 10 rows and 3 columns, the representative rows in the field summary table for the first column can be rows 1, 2 and 3, while the representative rows for the second column can be rows 2, 7 and 10, and the representative rows for the third column can be rows 5, 6 and 8. A method for generating such a field summary table is explained below in reference to FIG. 9.

Figure 9:
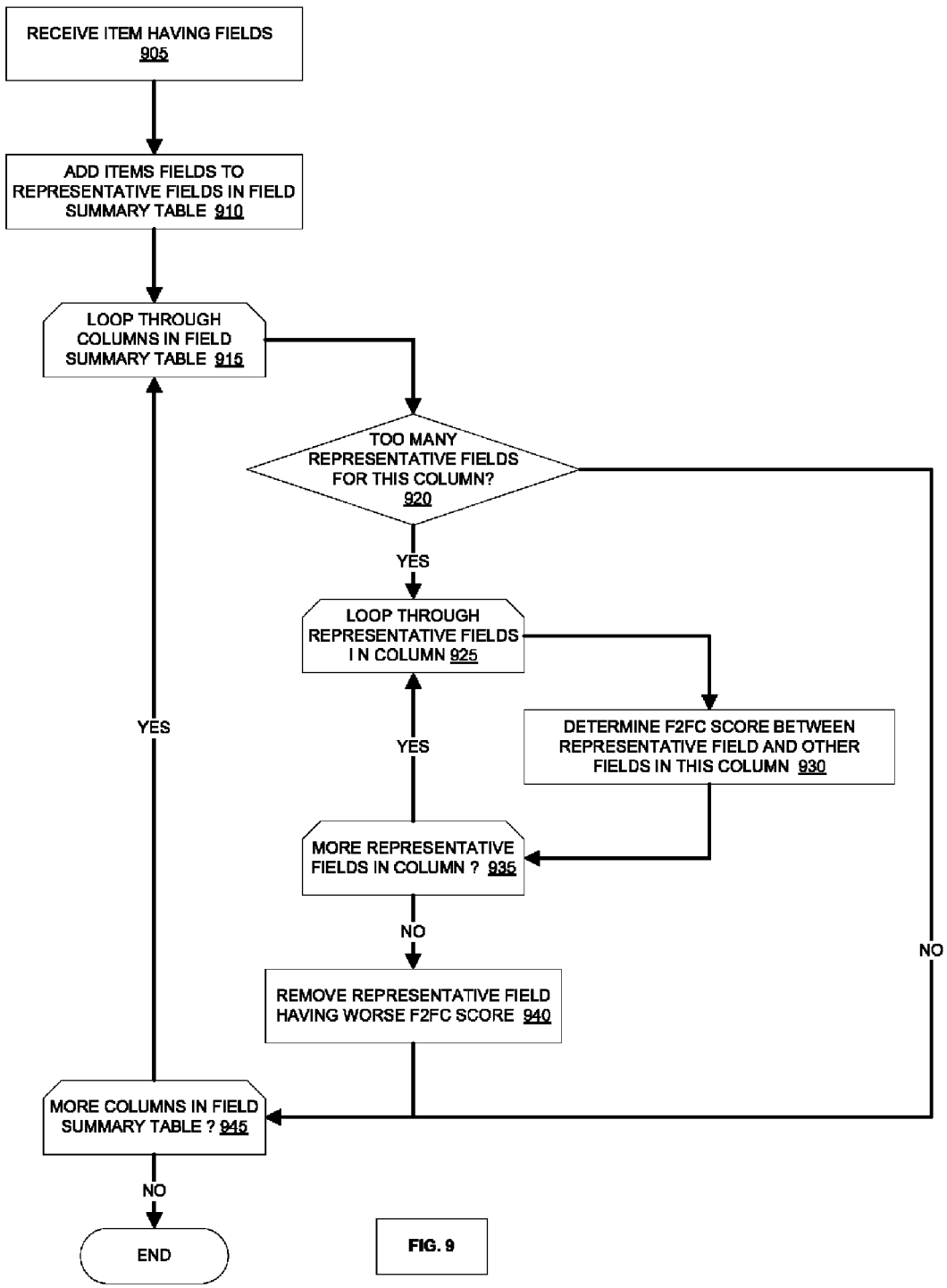
FIG. 9 is a flowchart illustrating a method for determining a summary of the fields

FIG. 9 discloses a method for generating a field summary table from items of a list that have been inserted into a database table. The method begins by receiving an item having one or more fields (905), and adding the information from the item's fields to cells in corresponding columns of a field summary table (910). Next, the method loops through all of the columns in the field summary table (915), and for each column determines whether the number of representative fields (i.e., rows or cells) for that column is above a threshold (920). In one implementation, the threshold is three representative fields per column. If the field summary table does not contain too many representative fields for a given column (920), the method proceeds to the next column of the field summary table (945), if one exists. If, however, the field summary table does contain too many representative fields for the given column (920), the method loops through the representative fields (925), and determines the field-to-field consistency score between the field value of each representative field and the field values for the other fields in that column (930). The field-to-field consistency (F2FC) score is the same score determined above as discussed in reference to FIGS. 4 and 5, and measures the average F2FC between the field value of the representative field and the field values of each of the other fields that are stored in the given column of the field summary table.

Once the average F2FC scores have been determined for the field values of each representative field in the given column of the field summary table (935), the representative field whose field value has the worse or lowest average F2FC score for the given column is removed from the field summary table (940). The process is then repeated for the other columns of the field summary table if they exist (945), otherwise the process terminates. Since the method described constantly discards the least consistent or poorest fitting representative field from each column of the field summary table, the quality of the representative fields that are stored in the field summary table is always improving. This constant improvement in the quality of the field summary table is useful in the alignment of an item's fields to database columns and in the re-splitting and realigning of inconsistent streaks as discussed above in reference to FIGS. 4-6.

The methods and apparatus described herein may be implemented in digital electronic circuitry, or in computer hardware, firmware, software, or in combinations of them. They may be implemented as a computer program product, i.e., as a computer program tangibly embodied in a machine-readable storage device for execution by, or to control the operation of, a processor, a computer, or multiple computers. Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). The method steps may be performed in the order shown or in alternative orders.

A computer program, such as the computer program(s) described above, can be written in any form of programming language, including compiled or interpreted languages, and can be deployed in any form, including as a stand-alone program or as a module, component, subroutine, plug-in or other unit suitable for use in a computing environment. A computer program can be deployed to be executed on one computer or on multiple computers at one site or distributed across multiple sites and interconnected by a communications network. Processors suitable for the execution of a computer program include, by way of example, both general and special purpose microprocessors, and any one or more processors of any kind of digital computer, including digital signal processors. Generally, a processor will receive instructions and data from a read-only memory or a random access memory or both.

Elements of a computer may include at least one processor for executing instructions and one or more memory devices for storing instructions and data. Generally, a computer may also include, or be operatively coupled to receive data from and/or transfer data to one or more mass storage devices for storing data, e.g., magnetic, magneto-optical disks, or optical disks. Machine readable media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the methods and apparatus may be implemented on a computer having a display device, e.g., a cathode ray tube (CRT) or liquid crystal display (LCD) monitor, for displaying information to the user and a keyboard and a pointing device, e.g., a mouse, trackball or touch pad, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The methods and apparatus described may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for extracting information from a list into a relational database table, comprising:
   receiving a list having a number of items;
   determining, by a processor of a computing system, for each one of a plurality of items of the list, a number of fields, which include a sequence of one or more consecutive terms of the item, wherein determining the number of fields for an item includes:
      removing delimiters from the item;
      determining a list of all field candidates for the item, wherein each field candidate contains one or more terms from the item;
      determining a field quality score for each field candidate, the field quality score indicating a likelihood that the terms of the field candidate can be grouped together into a common field; and
      iteratively until the list of field candidates is empty:
         identifying a first field candidate in the field candidate list having a highest field quality score;
         removing the first field candidate from the field candidate list;
         identifying the first field candidate as a field for the item;
         identifying overlapping field candidates from the field candidate list, wherein overlapping field candidates are field candidates that include one or more terms in common with the terms of the first field candidate; and
         removing overlapping field candidates from the field candidate list;
   determining, by a processor of the computing system, based on the determined numbers of fields for each one of the plurality of items of the list, a number of columns for the relational database table;
   identifying, by a processor of the computing system, an item from among the plurality of items of the list having a different number of determined fields than the determined number of columns;
   if the number of determined fields of the identified item is greater than the number of columns, merging the determined fields of the identified item and determining a number of new fields of the item so that the identified item has no more new fields than the number of columns and then if the number of new fields of the identified item is less than the number of columns, inserting one or more null fields into the identified item so the identified item has as many fields as the number of relational database table columns;
   if the number of determined fields of the identified item is less than the number of columns, inserting one or more null fields into the identified item so the identified item has as many fields as the number of relational database table columns; and writing information in the identified item into a row of the relational database table such that the information in each field of the identified item is written to a corresponding column of the row of the relational database table.

2. The computer-implemented method of claim 1, wherein determining the number of columns for the relational database comprises determining the most common number of fields determined for the plurality of items of the list.

3. The computer-implemented method of claim 1, wherein merging the determined fields of the identified item and determining a new number of fields of the identified item so that the identified item has no more fields than the number of columns comprises:

removing delimiters from the identified item;
determining a list of all field candidates for the identified item, wherein each field candidate contains one or more terms from the item;
determining a field quality score for each field candidate; and
iteratively until the list of field candidates is empty:
identifying a first field candidate in the field candidate list having a highest field quality score;
removing the first field candidate from the field candidate list;
determining the minimum number of fields needed to represent the identified item using the field candidates that remain in the field candidate list; and
identifying the first field candidate as a field for the identified item and identifying and removing overlapping field candidates from the field candidate list if the minimum number of fields needed to represent the identified item is not greater than the number of relational database columns.

4. The computer-implemented method of claim 1, wherein the field quality score of a field candidate is based on one or more component scores selected from the group consisting of:

a type support score that measures whether the type of data in the field candidate is of a recognizable type;
a table corpus support score that measures whether the field candidate exists in more than a predetermined number of tables obtained from a corpus of tables; and
a language model support score that includes an internal cohesiveness score that measures how likely the sequence of terms in the field candidate is to occur in documents obtained from a corpus of documents that are written in the same language as the list.

5. The computer-implemented method of claim 4, wherein the language model support score further includes an external cohesiveness component that measures:

a likelihood that the first term in the field candidate follows the last term in the immediately preceding field candidate in documents obtained from a corpus of documents; and
a likelihood that the last term in the field candidate precedes the first term in the immediately following field candidate in documents obtained from the corpus of documents.

6. The computer-implemented method of claim 1, wherein inserting the one or more null fields into the identified item so the identified item has as many fields as the number of relational database table columns comprises:

aligning each of the fields in the identified item with a corresponding column in the relational database table, wherein the alignment is based on a cost function that measures a cost to align each of the fields in the identified item with each of the columns in the relational database table; and
inserting the one or more null fields in the identified item so that the null fields are aligned with columns in the relational database table that are not aligned to any fields in the item.

7. The computer-implemented method of claim 6, wherein the cost function is based on one or more costs selected from the group consisting of: a cost of not aligning a field of the identified item to any column in the relational database table; a cost of not aligning a column of the relational database table to any field in the item; and a cost of aligning a field in the identified item with a column in the relational database table.

8. The computer-implemented of claim 7, wherein the cost of not aligning a column of the relational database table to any field in the identified item is set to a constant value that is the same for all of the columns in the relational database table.

9. The computer-implemented of claim 7, wherein the cost of not aligning a field of the identified item to any column in the relational database table is set to an extreme value so that all fields in the identified item are aligned to columns in the relational database table.

10. The computer-implemented method of claim 7, wherein the cost of aligning a field in the identified item to a column in the relational database table is based on one or more field-to-field consistency scores, wherein each field-to-field consistency score measures a consistency between a field value in the identified item and a cell value in one of the cells of the column and a row of the relational database table.

11. The computer-implemented method of claim 10, wherein each field-to-field consistency score includes a component selected from the group consisting of:

a data type consistency score that measures whether the field value and the cell value contain the same type of recognizable data;
a table corpus consistency score that measures a likelihood that the field value and the cell value can both be found in a column of a database table taken from a corpus of database tables;
a delimiter consistency score that measures a consistency between delimiters that separate the field value from adjacent field values in the identified item and delimiters that separate a field value written to the cell from adjacent field values written to cells in adjacent columns of the row; and
a syntax consistency score that measures the consistency of the syntactical appearance of the field value and the cell value.

12. The computer-implemented method of claim 11, wherein the syntax consistency score measures a consistency between a feature of the field value and the same feature of the cell value, wherein the feature is selected from the group consisting of: the number of letters; the number of upper case letters; the number of lower case letters; the number of digits; and the number of punctuation symbols.

13. The computer-implemented method of claim 1, further comprising:

identifying a streak having a first number of poorly matching cells in a row of the relational database table, wherein the streak is defined by a plurality of adjacent columns in the row whose cells have field-to-field consistency scores that are below a threshold;

merging the first number of poorly matching cells in the identified streak and determining a second number of new cells for the identified streak, wherein the second number is no greater than the first number;

inserting a number of null cells into the identified streak when the second number is less than the first number, wherein the number of cells inserted into the identified streak is equal to the difference between the first number and the second number; and writing the information from the new cells determined for the identified streak into the row and plurality of columns of the relational database table that defines the identified streak.

14. A system, comprising:
at least one processor, wherein the at least one processor is configured for executing instructions to:
  receive a list having a number of items;
  determine, for each one of a plurality of items of the list, a number of fields, which include a sequence of one or more consecutive terms of the item, wherein determining the number of fields for an item includes:
    remove delimiters from the item;
    determine a list of all field candidates for the item, wherein each field candidate contains one or more terms from the item;
    determine a field quality score for each field candidate, the field quality score indicating a likelihood that the terms of the field candidate can be grouped together into a common field; and
    iteratively until the list of field candidates is empty:
      identify a first field candidate in the field candidate list having a highest field quality score;
      remove the first field candidate from the field candidate list;
      identify the first field candidate as a field for the item;
      identify overlapping field candidates from the field candidate list, wherein overlapping field candidates are field candidates that include one or more terms in common with the terms of the first field candidate; and
      remove overlapping field candidates from the field candidate list;
  determine, based on the determined numbers of fields for the plurality of items of the list, a number of columns for the relational database table;
  identify an item from among the plurality of items of the list having a different number of determined fields than the determined number of columns;
  if the number of determined fields of the identified item is greater than the number of columns, merge the determined fields of the identified item and determine a number of new fields of the item so that the identified item has no more new fields than the number of columns and then if the number of new fields is less than the number of columns, insert one or more null fields into the identified item so the identified item has as many fields as the number of relational database table columns;
  if the number of determined fields of the identified item is less than the number of columns, insert one or more null fields into the identified item so the identified item has as many fields as the number of relational database table columns; and
  write the information in the identified item into a row of the relational database table such that the information in each field of the identified item is written to a corresponding column of the row of the relational database table.

15. The system of claim 14, wherein the instruction to determine the number of relational database columns from the number of fields in the plurality of items of the list comprises instructions to determine the most common number of fields determined from the plurality of items of the list.

16. The system of claim 14, wherein the instruction to merge the determined fields of the identified item and determine a new number of fields of the identified item so that the identified item has no more fields than the number of columns comprises instructions to:
  remove delimiters from the identified item;
  determine a list of all field candidates for the identified item, wherein each field candidate contains one or more terms from the item;
  determine a field quality score for each field candidate; and
  iteratively until the list of field candidates is empty:
    identify a first field candidate in the field candidate list having a highest field quality score;
    remove the first field candidate from the field candidate list;
    determine the minimum number of fields needed to represent the identified item using the field candidates that remain in the field candidate list; and
    identify the first field candidate as a field for the identified item and identify and remove overlapping field candidates from the field candidate list if the minimum number of fields needed to represent the identified item is not greater than the number of relational database columns.

17. The system of claim 14, wherein the field quality score of a field candidate is based on one or more component scores selected from the group consisting of:
  a type support score that measures whether the type of data in the field candidate is of a recognizable type;
  a table corpus support score that measures whether the field candidate exists in more than a predetermined number of tables obtained from a corpus of tables; and
  a language model support score that includes an internal cohesiveness score that measures how likely the sequence of terms in the field candidate is to occur in documents obtained from a corpus of documents that are written in the same language as the list.

18. The system of claim 17, wherein the language model support score further includes an external cohesiveness component that measures:
  a likelihood that the first term in the field candidate follows the last term in the immediately preceding field candidate in documents obtained from a corpus of documents; and
  a likelihood that the last term in the field candidate precedes the first term in the immediately following field candidate in documents obtained from the corpus of documents.

19. The system of claim 14, wherein the instruction to insert the one or more null fields into the identified item so the identified item has as many fields as the number of relational database table columns comprises instructions to:
  align each of the fields in the identified item with a corresponding column in the relational database table, wherein the alignment is based on a cost function that measures a cost to align each of the fields in the identified item with each of the columns in the relational database table; and insert the one or more null fields in the identified item so that the null fields are aligned with columns in the relational database table that are not aligned to any fields in the item.

20. The system of claim 19, wherein the cost function is based on one or more costs selected from the group consisting of: a cost to not align a field of the identified item to any column in the relational database table; a cost to not align a column of the relational database table to any field in the item; and a cost to align a field in the identified item with a column in the relational database table.

21. The system of claim 20, wherein the cost to not align a column of the relational database table to any field in the identified item is set to a constant value that is the same for all of the columns in the relational database table.

22. The system of claim 20, wherein the cost to not align a field of the identified item to any column in the relational database table is set to an extreme value so that all fields in the identified item are aligned to columns in the relational database table.

23. The system of claim 20, wherein the cost to align a field in the identified item to a column in the relational database table is based on one or more field-to-field consistency scores, wherein each field-to-field consistency score measures a consistency between a field value in the identified item and a cell value in one of the cells of the column and a row of the relational database table.

24. The system of claim 23, wherein each field-to-field consistency score includes a component selected from the group consisting of:
    a data type consistency score that measures whether the field value and the cell value contain the same type of recognizable data;
    a table corpus consistency score that measures a likelihood that the field value and the cell value can both be found in a column of a database table taken from a corpus of database tables;
    a delimiter consistency score that measures a consistency between delimiters that separate the field value from adjacent field values in the identified item and delimiters that separate a field value written to the cell from adjacent field values written to cells in adjacent columns of the row; and
    a syntax consistency score that measures the consistency of the syntactical appearance of the field value and the cell value.

25. The system of claim 24, wherein the syntax consistency score measures a consistency between a feature of the field value and the same feature of the cell value, wherein the feature is selected from the group consisting of: the number of letters; the number of upper case letters; the number of lower case letters; the number of digits; and the number of punctuation symbols.

26. The system of claim 14, wherein the instructions executed by the processor further comprise instructions to:
    identify a streak having a first number of poorly matching cells in a row of the relational database table, wherein the streak is defined by a plurality of adjacent columns in the row whose cells have field-to-field consistency scores that are below a threshold;
    merge the first number of poorly matching cells in the identified streak and determine a second number of new cells for the identified streak, wherein the second number is no greater than the first number;
    insert a number of null cells into the identified streak when the second number is less than the first number, wherein the number of cells inserted into the identified streak is equal to the difference between the first number and the second number; and
    write the information from the new cells determined for the identified streak into the row and plurality of columns of the relational database table that defines the identified streak.

27. A computer program product, tangibly embedded on a non-transitory machine readable medium, comprising instructions operable to cause a programmable processor to:
    receive a list having a number of items;
    determine, for each one of a plurality of items of the list, a number of fields, which include a sequence of one or more consecutive terms of the item, wherein determining the number of fields for an item includes:
        removing delimiters from the item;
        determining a list of all field candidates for the item, wherein each field candidate contains one or more terms from the item;
        determining a field quality score for each field candidate, the field quality score indicating a likelihood that the terms of the field candidate can be grouped together into a common field; and
        iteratively until the list of field candidates is empty:
            identifying a first field candidate in the field candidate list having a highest field quality score;
            removing the first field candidate from the field candidate list;
            identifying the first field candidate as a field for the item;
            identifying overlapping field candidates from the field candidate list, wherein overlapping field candidates are field candidates that include one or more terms in common with the terms of the first field candidate; and
            removing overlapping field candidates from the field candidate list;
    determine, based on the determined numbers of fields for the plurality of items of the list, a number of columns for the relational database table;
    identify an item from among the plurality of items of the list having a different number of determined fields than the determined number of columns;
    if the number of determined fields of the identified item is greater than the number of columns, merge the determined fields of the identified item and determine a number of new fields of the item so that the identified item has no more new fields than the number of columns and then if the number of new fields is less than the number of columns, insert one or more null fields into the identified item so the identified item has as many fields as the number of relational database table columns;
    if the number of determined fields of the identified item is less than the number of columns, insert one or more null fields into the identified item so the identified item has as many fields as the number of relational database table columns; and
    write the information in the identified item into a row of the relational database table such that the information in each field of the identified item is written to a corresponding column of the row of the relational database table.

28. The computer program product of claim 27, wherein the instruction to cause the programmable processor to determine the number of columns for the relational database comprises instructions to cause the programmable processor to determine the most common number of fields determined for the plurality of items of the list.

29. The computer program product of claim 27, wherein the instruction to cause the programmable processor to merge the determined fields of the identified item and determine a new number of fields of the identified item so that the identified item has no more fields than the number of columns further comprises instructions to cause the programmable processor to:
  remove delimiters from the identified item;
  determine a list of all field candidates for the identified item, wherein each field candidate contains one or more terms from the item;
  determine a field quality score for each field candidate; and
  iteratively until the list of field candidates is empty:
    identify a first field candidate in the field candidate list having a highest field quality score;
    remove the first field candidate from the field candidate list;
    determine the minimum number of fields needed to represent the identified item using the field candidates that remain in the field candidate list; and
    identify the first field candidate as a field for the identified item and identify and remove overlapping field candidates from the field candidate list if the minimum number of fields needed to represent the identified item is not greater than the number of relational database columns.

30. The computer program product of claim 27, wherein the field quality score of a field candidate is based on one or more component scores selected from the group consisting of:
  a type support score that measures whether the type of data in the field candidate is of a recognizable type;
  a table corpus support score that measures whether the field candidate exists in more than a predetermined number of tables obtained from a corpus of tables; and
  a language model support score that includes an internal cohesiveness score that measures how likely the sequence of terms in the field candidate is to occur in documents obtained from a corpus of documents that are written in the same language as the list.

31. The computer program product of claim 30, wherein the language model support score further includes an external cohesiveness component that measures:
  a likelihood that the first term in the field candidate follows the last term in the immediately preceding field candidate in documents obtained from a corpus of documents; and
  a likelihood that the last term in the field candidate precedes the first term in the immediately following field candidate in documents obtained from the corpus of documents.

32. The computer program product of claim 27, wherein the instruction to cause the programmable processor to insert the one or more null fields into the identified item so the identified item has as many fields as the number of relational database table columns further comprises instructions to cause the programmable processor to:
  align each of the fields in the identified item with a corresponding column in the relational database table, wherein the alignment is based on a cost function that measures a cost to align each of the fields in the identified item with each of the columns in the relational database table; and
  insert the one or more null fields in the identified item so that the null fields are aligned with columns in the relational database table that are not aligned to any fields in the item.

33. The computer program product of claim 32, wherein the cost function is based on one or more costs selected from the group consisting of: a cost to not align a field of the identified item to any column in the relational database table; a cost to not align a column of the relational database table to any field in the item; and a cost to align a field in the identified item with a column in the relational database table.

34. The computer program product of claim 33, wherein the cost to not align a column of the relational database table to any field in the identified item is set to a constant value that is the same for all of the columns in the relational database table.

35. The computer program product of claim 33, wherein the cost to not align a field of the identified item to any column in the relational database table is set to an extreme value so that all fields in the identified item are aligned to columns in the relational database table.

36. The computer program product of claim 33, wherein the cost to align a field in the identified item to a column in the relational database table is based on one or more field-to-field consistency scores, wherein each field-to-field consistency score measures a consistency between a field value in the identified item and a cell value in one of the cells of the column and a row of the relational database table.

37. The computer program product of claim 36, wherein each field-to-field consistency score includes a component selected from the group consisting of:
  a data type consistency score that measures whether the field value and the cell value contain the same type of recognizable data;
  a table corpus consistency score that measures a likelihood that the field value and the cell value can both be found in a column of a database table taken from a corpus of database tables;
  a delimiter consistency score that measures a consistency between delimiters that separate the field value from adjacent field values in the identified item and delimiters that separate a field value written to the cell from adjacent field values written to cells in adjacent columns of the row; and
  a syntax consistency score that measures the consistency of the syntactical appearance of the field value and the cell value.

38. The computer program product of claim 37, wherein the syntax consistency score measures a consistency between a feature of the field value and the same feature of the cell value, wherein the feature is selected from the group consisting of: the number of letters; the number of upper case letters; the number of lower case letters; the number of digits; and the number of punctuation symbols.

39. The computer program product of claim 27, further comprising instructions to cause the programmable processor to:
  identify a streak having a first number of poorly matching cells in a row of the relational database table, wherein the streak is defined by a plurality of adjacent columns in the row whose cells have field-to-field consistency scores that are below a threshold;

merge the first number of poorly matching cells in the identified streak and determine a second number of new cells for the identified streak, wherein the second number is no greater than the first number;

insert a number of null cells into the identified streak when the second number is less than the first number, wherein the number of cells inserted into the identified streak is equal to the difference between the first number and the second number; and write the information from the new cells determined for the identified streak into the row and plurality of columns of the relational database table that defines the identified streak.

* * * * *

UNITED STATES PATENT AND TRADEMARK OFFICE
CERTIFICATE OF CORRECTION

| | |
|---|---|
| PATENT NO. | : 8,140,533 B1 |
| APPLICATION NO. | : 12/694160 |
| DATED | : March 20, 2012 |
| INVENTOR(S) | : Hazem Elmeleegy et al. |

It is certified that error appears in the above-identified patent and that said Letters Patent is hereby corrected as shown below:

On first page, in field (56), under "OTHER PUBLICATIONS", in column 2, line 2, delete "Journel," and insert -- Journal, --, therefor.

In column 18, line 19, in claim 8, before "of" insert -- method --.

In column 18, line 23, in claim 9, before "of" insert -- method --.

Signed and Sealed this
Twenty-ninth Day of May, 2012

David J. Kappos
*Director of the United States Patent and Trademark Office*